US012252415B2

(12) United States Patent
Gorji (10) Patent No.: US 12,252,415 B2
(45) Date of Patent: Mar. 18, 2025

(54) WATER FILTRATION AND AERATION UNIT (71) Applicant: WETS LLC, Sugar Land, TX (US)

(72) Inventor: Keyur Gorji, Sugar Land, TX (US)

(73) Assignee: WETS LLC, Sugar Land, TX (US)

( * ) Notice: Subject to any disclaimer, the term of this patent is extended or adjusted under 35 U.S.C. 154(b) by 416 days.

(21) Appl. No.: 17/834,245

(22) Filed: Jun. 7, 2022

(65) Prior Publication Data
US 2022/0402776 A1 Dec. 22, 2022

Related U.S. Application Data (60) Provisional application No. 63/208,757, filed on Jun. 9, 2021.

(51) Int. Cl.
C02F 1/76 (2023.01)
B01D 24/10 (2006.01)
(Continued)

(52) U.S. Cl.
CPC ............ C02F 1/004 (2013.01); B01D 24/105 (2013.01); B01D 24/40 (2013.01); B01D 24/4636 (2013.01); B01F 23/2132 (2022.01); B01F 23/214 (2022.01); B01F 23/2319 (2022.01); B01F 23/2322 (2022.01);
(Continued)

(58) Field of Classification Search
None
See application file for complete search history.

(56) References Cited

U.S. PATENT DOCUMENTS 4,282,097 A * 8/1981 Kuepper ............... B01D 29/58
210/243
4,455,157 A * 6/1984 Honerkamp ......... B01D 53/263
96/333
(Continued)

OTHER PUBLICATIONS

Khorsandi, H.; Movahedyan, H.; Bina, B.; Farrokhzadeh, H. "Innovative anaerobic upflow sludge blanket filtration combined bioreactor for nitrogen removal from municipal wastewater." Int. J. Environ Sci. Tech (2022) 8(2), 417-424.
(Continued)

Primary Examiner — Chester T Barry
(74) Attorney, Agent, or Firm — Boulware & Valoir PLLC (57) ABSTRACT A combined water aeration and filtration unit (WAFU), having a tank with a vent section at a top of said WAFU and above an aeration section above a filtration section at a bottom of said WAFU. The vent section has one or more demisters and one or more vents for detraining water and providing a dry air exit from said WAFU. The air section has a water inlet ending in a spray nozzle near the top of the aeration section to turn incoming dirty water into water droplets and a forced air blower on a side or top of the aeration section for blowing air through said water droplets in rate sufficient to remove volatile organic compounds and precipitate manganese and iron. The aeration section also has one or more annular rings or partially annular baffles on an inside wall of the tank to force water from said inside wall into an interior of the tank. Thus, no water escapes aeration. A backwash collection trough and backwash water outlet are positioned above the filtration section for removing dirty backwash water from the unit. The filtration section has one or more filters therein and a drain and clean water outlet near its bottom for egress of clean water from said WAFU.

25 Claims, 8 Drawing Sheets (51) Int. Cl.
- *B01D 24/40* (2006.01)
- *B01D 24/46* (2006.01)
- *B01F 23/21* (2022.01)
- *B01F 23/213* (2022.01)
- *B01F 23/23* (2022.01)
- *B01F 23/232* (2022.01)
- *B01F 23/237* (2022.01)
- *C02F 1/00* (2023.01)
- *C02F 1/20* (2023.01)
- *C02F 1/52* (2023.01)
- *B01F 101/00* (2022.01)
- *C02F 101/20* (2006.01)
- *C02F 101/32* (2006.01)
- *C02F 103/00* (2006.01)
- *C02F 103/06* (2006.01)

(52) U.S. Cl.
CPC ...... *B01F 23/237611* (2022.01); *C02F 1/008* (2013.01); *C02F 1/20* (2013.01); *C02F 1/52* (2013.01); *C02F 1/76* (2013.01); *B01D 2101/02* (2013.01); *B01D 2101/04* (2013.01); *B01F 2101/305* (2022.01); *C02F 2101/203* (2013.01); *C02F 2101/206* (2013.01); *C02F 2101/322* (2013.01); *C02F 2103/007* (2013.01); *C02F 2103/06* (2013.01); *C02F 2209/40* (2013.01); *C02F 2209/42* (2013.01); *C02F 2303/02* (2013.01); *C02F 2303/04* (2013.01); *C02F 2303/16* (2013.01)

(56) References Cited

OTHER PUBLICATIONS

National Primary Drinking Water Regulations (updated Jan. 2022). Available online at https://www.epa.gov/ground-water-and-drinking-water/national-primary-drinking-water-regulations.

\* cited by examiner

WATER FILTRATION AND AERATION UNIT

This application claims priority to U.S. Ser. No. 63/208,757, titled WATER FILTRATION AND AERATION UNIT, and filed Jun. 9, 2021. It is incorporated by reference in its entirety for all purposes.

FEDERALLY SPONSORED RESEARCH STATEMENT

Not applicable.

FIELD OF THE DISCLOSURE

The disclosure generally relates to devices, systems, and methods of water purification.

BACKGROUND OF THE DISCLOSURE

Water quality refers to the chemical, physical, and biological characteristics of water based on the standards of its usage. It is most frequently used by reference to a set of standards against which compliance, generally achieved through treatment of the water, can be assessed. The most common standards used to monitor and assess water quality address the health of ecosystems, safety of human contact, and condition of drinking water. In the US, drinking water standards are published by the EPA. See epa.gov/groundwaterand-drinking-water/national-primary-drinking-water-regulation-table, incorporated by reference in its entirety for all purposes.

Well water and surface water intended for human consumption contain many contaminants that are potentially hazardous to humans. Contaminants include dissolved mineral matter, dissolved gases, sediments and turbidity, organic matter (color, taste and odors), microorganisms such as viruses, protozoa and bacteria; organic chemical contaminants from industrial processes and petroleum use, pesticides and herbicides and radioactive impurities.

Water purification is the process of removing these undesirable chemicals, biological contaminants, suspended solids, and gases from water. The goal is to produce water fit for specific purposes. Most water is purified and disinfected for human consumption (drinking water), but water purification may also be carried out for a variety of other purposes, including medical, pharmacological, chemical, and industrial applications.

Visual inspection cannot determine if water is of appropriate quality. Simple procedures such as boiling or the use of a household activated carbon filter are not sufficient for treating all possible contaminants that may be present in water from an unknown source. Even natural spring water, which was considered safe for all practical purposes in the 19th century, must now be tested before determining what kind of treatment is needed before drinking. Chemical and microbiological analysis, while expensive, are the only way to obtain the information necessary for deciding on the appropriate method of purification.

Figure 1:
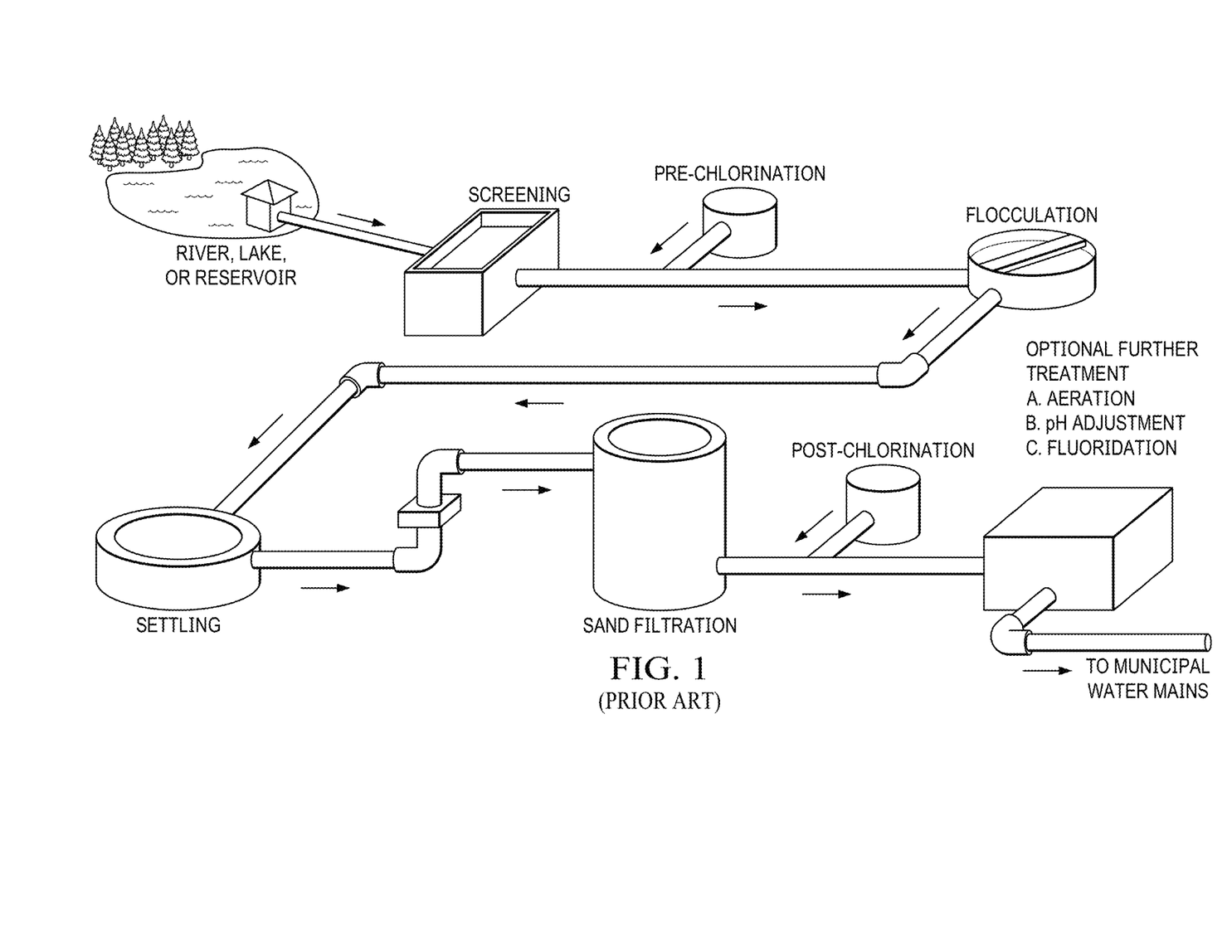
FIG. 1. Prior art water treatment system including flocculation and settling, filtration, and chlorination.
Figure 2:
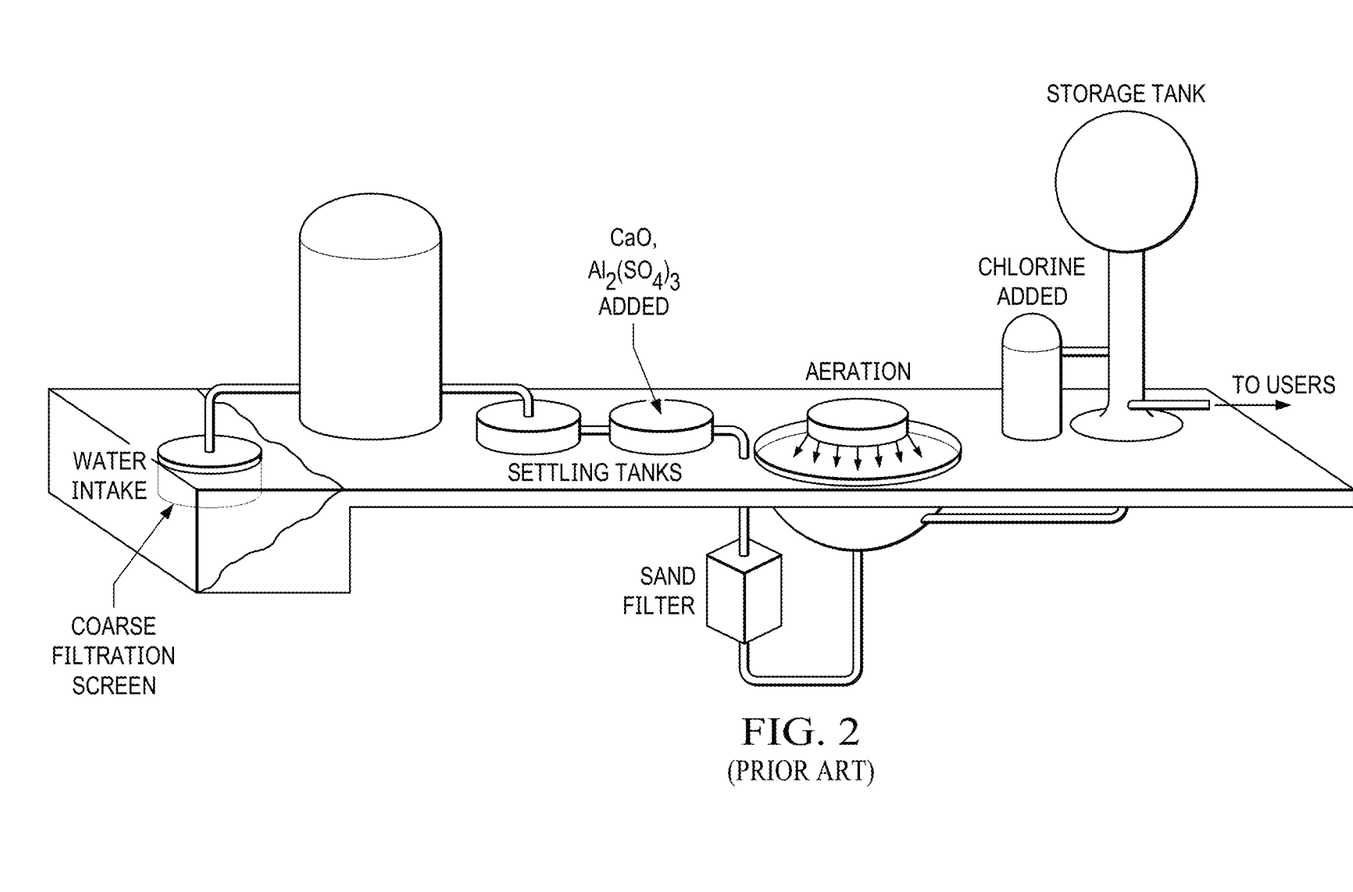
FIG. 2. Prior art water treatment system including flocculation and settling, filtration, aeration and chlorination.

The methods used in water purification include physical processes such as filtration, sedimentation, and distillation; biological processes such as slow sand filters or biologically active carbon; chemical processes such as flocculation and chlorination; and the use of electromagnetic radiation such as ultraviolet light. FIG. 1 shows a typical municipal system with several of these elements arranged in series. FIG. 2 shows another such prior art system. A large footprint is needed for such systems.

Stand-alone filtration, aeration and chlorination have been used for solid, mineral, and gas impurity removal for many years. Filtration as a process for water purification has been employed for thousands of years, starting with the use of sand filters. In aeration, the water is exposed to air and the oxygen in the air. This treatment can both strip out objectionable dissolved gases and oxidize dissolved mineral material. The dissolved mineral material, when oxidized, precipitates and can then be removed by filters, centrifugation, settling, and the like. In chlorination, chlorine (in several possible forms) is added to the water. Chlorine, a strong oxidant, provides for the destruction or inactivation of disease-causing microorganisms, along with oxidation of the dissolved mineral matter. Chlorine level is maintained in the distributed water at a residue concentration to protect against bacterial growth in the distribution system. These three processes are typically employed as individual operations.

WETS LLC, in its 45-year history, has designed, constructed, and installed hundreds of individual aeration and filtration units per the current state of the art. It is very typical for a water treatment plant to employ both aeration and filtration, and in the current state of the art, these operations are conducted in separate vessels that are separately supported, with chlorine injection typically positioned between the aeration and filtration equipment.

A majority of WETS projects have involved the presence of iron and manganese compounds in water that have posed problems related to deposition of solids in the treatment systems, due to conversion to insoluble iron and manganese compounds. Problems have included fouling of packing in aerators, and clogging of vessel outlets and piping, which result in the need to shut down the unit to replace packing and clean out depositions.

While separate aeration, filtration and chlorination treatments have been adequate to treat drinking water in the past, it would be an advantage in space and cost savings if two or more functions could be combined into a single unit, and it would be an additional advantage to have a system that could minimize problems associated with iron and manganese solids depositions. Any reduction in footprint size may allow the use of compact units in places that otherwise would lack safe drinking water and would also be of benefit in municipal facilities. This invention meets one or more of these needs.

SUMMARY OF THE DISCLOSURE

The invention comprises a unit, system, and method in which the aeration and filtration (or aeration, filtration and chlorination) occurs in a single vessel. The innovation reduces equipment cost, total installed cost, and simplifies the operation. It can also reduce the footprint needed for equipment. The process is applicable where uses of these processes is desired to meet the water maximum contaminant limits set by federal and state governments.

Aeration water treatment is effective for management of dissolved gases such as radon, carbon dioxide, methane, some taste and odor problems such as hydrogen sulfide, as well as volatile organic compounds, like methyl tert-butyl ether (MTBE); trihalomethanes (THMs), such as chloroform; gasoline hydrocarbons, industrial solvents, refrigerants, and fumigants. It is also effective in precipitating dissolved iron and manganese, which can then be filtered out. However, aeration is not effective for removal of heavy metal, radionuclides, or pathogenic (disease-causing) organisms like bacteria and viruses.

In order to provide sufficient surface area for contact, packing is typically used in the aerator. However, when iron and manganese are present in the water, the packing becomes fouled over time, resulting in a loss of efficiency and capacity for the aerator. Also, due to the fouling, there is increased bacterial growth on the packing as portions of the packing are not exposed to the chlorine in water. Solids deposition also occurs at the bottom and exit piping of the aerator.

Combining aeration and filtration into a single unit, as well as optional chlorination, has the ability to handle many purification problems in a smaller footprint and with reduced capital costs. With aeration and filtration in a single unit, there is no issue with iron and manganese deposition at the bottom and exit piping of the aerator; the insoluble iron and manganese particles move directly from aeration to filtration. In addition, a design without packing would eliminate the issue of packing fouling.

People have tried to combine aeration and filtration in the past, but success has been elusive, mainly because it has been difficult to obtain sufficient aeration in a filtration unit. Aeration in an open chamber is also practiced, though the concern is getting adequate contact between the air and the water. Much of the water is not properly exposed in the aeration section, and is not aerated enough to meet quality standards.

However, by implementing a sprayer system to break water into droplets, combined with a forced air blower system and annular distributor rings or baffles to prevent the water from merely sheeting down the inside of the unit, we have been able to achieve sufficient aeration to meet drinking water standards, without the use of packing in the aerator. This design dramatically reduces problems with fouling due to iron and manganese salt deposition, as there is no fouled packing and no solids accumulation at aerator bottom and vessel outlet. A properly designed system of vents with mist eliminators at top of the vessel eliminates water losses and mist entrainment from vents.

The unit, system and method generally comprises a treatment vessel with combined aeration and filtration sections. Feed water is pumped through spray nozzles into the treatment vessel and air is introduced by means of a forced draft blower mounted on top or on the side of the treatment vessel. Due to the combined effect of the spray nozzles, the forced air blower and the distributor rings or baffles on the walls of the unit to prevent water channeling down the walls, the water is sufficiently aerated for use as drinking water when combined with the filtration in the same unit, depending on the type and level of contamination. Some water may require additional purification components such as precipitants, flocculants and coagulants to remove additional material, and clarifiers or sedimentation units, water softeners, fluoridation treatment, and like may be included in a complete system.

One or more vents located on top of the process vessel, equipped with mist elimination media, will remove entrained liquids from the vented air stream, thus reducing water losses. Entrained water will collect on the demister and drop back down into the unit while air is passed out through the vent. Demisting media can be polymeric, such a fibrous PP, PVC, PTFE, Teflon and the like, fiberglass, or can be metal or wire demisters. A preferred demister is a polymeric demister pad since these are lightweight and inexpensive.

Chlorine injection can occur between the aeration and filtration sections and thus be a part of the combined unit, or be up- or downstream of the unit, and can be injected at more than one location. Upstream injection may be preferred as it keeps the entire unit free of biological contaminant and their resulting biofilms, however, injection above or into the filtration section is also possible. Downstream chlorination is typically required to maintain the residue concentration in the ground storage tank (GST) and the downstream system.

Chlorination typically uses either chlorine or chloramines. Chlorine present at concentrations of 0.2-1 mg/liter and up to 4 milligrams per liter (mg/L or 4 parts per million (ppm)) are considered safe in drinking water. Less commonly, utilities use other disinfectants, such as chlorine dioxide. Unlike chlorine, chlorine dioxide does not hydrolyze in water. Therefore, its germicidal activity is relatively constant over a broad pH range. At pH 8.5, chlorine dioxide maintains the same kill rate, but chlorine requires five times as long. Thus, chlorine dioxide should be considered as a primary disinfectant for high pH, lime-softened waters.

A filtration section is positioned directly below the aeration section, where the water is filtered and the clean filtered water removed near the bottom. The liquid level in the filtration section is maintained above the backwash collection tray/trough and below the chlorine injection point (if present) by use of an ultrasonic or differential pressure fluid level transmitter, such as those by Bulletin 873C Proximity-style Ultrasonic Sensors by Allen Bradley, the LevelMaster or the pressure transmitter PAS100 by ABB etc. Transfer pumps equipped with variable speed drives, such as the Flyght pump by Xylem, are regulated by the fluid level transmitter in the filtration section and serve to help control the water level.

The aeration/filtration vessel material of construction is typically fiberglass or aluminum, but may also be other materials. Fiberglass vessels are fabricated to NSF International, Code 61 standards for drinking water, and can be, for instance, Dion 6631® Isophthalic Polyester Resin.

We have exemplified the system herein with an anthracite sand gravel rapid sand filtration where water moves vertically through sand that has a layer of anthracite above it. Anthracite (unactivated coal-based carbon) is a low density media that removes organic compounds, while remaining suspended particles get trapped in pore spaces or adhere to sand particles. Anthracite has benefits such as higher service flow rates, longer filter runs, reduced backwash rates, reduced head loss compared to single media filter beds and generally extends the life of the filter beds.

However, filtration is not limited to same. Other suitable filter media include diatomaceous earth, bone char, activated charcoal, Greensand Plus, and Micro-Z (zeolite). One can even employ a biological filtration system (aka slow sand filter) where bacteria treat the water, such as in natural ponds and swimming pools. Although still uncommon, 16 full-scale treatment plants with integrated biological and reverse osmosis membrane treatment systems have been implemented in the Canadian First Nations and could last up to 20 years.

The unit and method of the invention may be combined with any other components found in municipal water treatment systems. For example, other disinfectants such as ozone or ultraviolet radiation could be used. Ion exchange or reverse osmosis could be used to remove microscopic and dissolved particles from the water. Fluorine may be added to the treated water and/or the pH may be adjusted. Precipitants, flocculants and/or coagulants can be used to remove certain elements/chemicals, and other components may include various storage tanks, anaerobic digesters, clarifiers, prescreening or prefiltration and the like, as needed for a given set of contaminants.

The invention includes any one or more of the following embodiment(s) in any combination(s) thereof, but each possible combination is not separately listed in the interests of brevity.

A combined water aeration and filtration unit (WAFU), the WAFU comprising:
a) a tank with a vent section at a top of the WAFU and above an aeration section;
b) the aeration section above a filtration section at a bottom of the WAFU;
c) the vent section comprising one or more demisters and one or more vents for detraining water and providing a dry air exit from the WAFU;
d) the aeration section comprising a water inlet ending in a spray nozzle near a top of the aeration section to turn incoming dirty water into water droplets;
e) the aeration section comprising a forced air blower on a side or top of the aeration section for blowing air through the water droplets in rate sufficient to remove volatile organic compounds and precipitate manganese and iron;
f) the aeration section further comprising one or more protrusions on an inside wall of the tank to force water from the inside wall into an interior of the tank;
g) a backwash collection trough and backwash water outlet positioned above the filter section for removing dirty backwash water from the WAFU;
h) the filter section having one or more filters therein and having a drain and clean water outlet near a bottom of the filter section for egress of clean water from the WAFU.

A combined water aeration and filtration unit (WAFU), the WAFU comprising:
a) a tank with a vent section at a top of the WAFU and above an aeration section,
b) the aeration section above a filtration section at a bottom of the WAFU;
c) the vent section comprising one or more demisters and one or more vents for detraining water and providing a dry air exit from the WAFU;
d) the aeration section comprising a water inlet ending in a spray nozzle near a top of the aeration section to turn incoming dirty water into water droplets;
e) the aeration section comprising a forced air blower on a side or top of the aeration section for blowing air through the water droplets in rate sufficient to remove volatile organic compounds and precipitate manganese and iron;
f) the aeration section further comprising one or more protrusions on an inside wall of the tank to force water from the inside wall into an interior of the tank;
g) a backwash collection trough and backwash water outlet positioned above the filter section for removing dirty backwash water from the WAFU;
h) the filter section having one or more filters therein and having a drain and clean water outlet near a bottom of the filter section for egress of clean water from the WAFU.

A process for water purification, comprising
a) providing dirty water to any WAFU herein described via the water inlet;
b) blowing air through the dirty water in the aeration section to provide aerated water;
c) filtering the aerated water in the filtration section to provide clean water;
d) collecting clean water from the clean water outlet;
e) continuing steps a-d until the filtration section is dirty;
f) halting steps a-d and running clean water in through the clean water outlet and out the backwash water outlet until the filtration section is cleaned; and
g) repeating steps a-f) one or more times.

A process for water purification, comprising
a) providing dirty water to any WAFU herein described via the water inlet;
b) blowing air through the dirty water in the aeration section to provide aerated water;
c) injecting disinfectant above the backwash collection trough into said aerated water to provide chlorinated water;
d) filtering the chlorinated water in the filtration section to provide clean water;
e) collecting clean water from the clean water outlet;
f) continuing steps a-d until the filtration section is dirty;
g) halting steps a-e and running clean water in through the clean water outlet and out the backwash water outlet until the filtration section is cleaned; and The invention includes any one or more of the following embodiment(s) in any combination(s) thereof, but each possible combination is not separately listed in the interests of brevity.

h) repeating steps a-g one or more times.

A process for purification, comprising;
a) a source of dirty water;
b) means to pump the dirty water from the source to any WAFU herein described; and
c) means to pump the clean water to a distribution system for consumers.

Any WAFU, process or system herein described, wherein the forced air blower is mounted near the top of the WAFU or wherein the forced air blower is mounted on a sidewall near a bottom of the aeration section.

Any WAFU, process or system herein described, wherein the tank is ≥5 feet in diameter and the forced air blower is centrally mounted at the top of the WAFU surrounded by three equally spaced vents and the water inlet has a plurality of spray nozzles spraying water across a diameter of the tank.

Any WAFU, process or system herein described, wherein a section of loose plastic fiber packing is added to the aeration section to increase water air contact and mass transfer.

Any WAFU, process or system herein described, wherein disinfectant is injected into the WAFU below the aeration section and above the backwash collection trough.

Any WAFU, process or system herein described, wherein disinfectant is injected into the WAFU below the aeration section and 1-3 feet above the backwash collection trough.

Any WAFU, process or system herein described, wherein the disinfectant is chorine.

Any WAFU, process or system herein described, wherein a liquid level in the filtration section is maintained by an ultrasonic level transmitter regulating one or more pumps providing water to the water inlet.

Any WAFU, process or system herein described, wherein the protrusions comprise an annular ring or partially annular baffles or a screen across the tank.

Any WAFU, process or system herein described, wherein the filter section comprises a gravel base, sand middle layer and anthracite top layer.

Any WAFU, process or system herein described, further comprising a chlorine source for injecting chlorine into the dirty water before the WAFU, or a chlorine source for injecting chlorine into the WAFU above the backwash water outlet, or both.

Any WAFU, process or system herein described, further comprising one or more water purification units positioned downstream of the clean water outlet and before the distribution system.

Any WAFU, process or system herein described, further comprising one or more water purification units positioned upstream of the dirty water inlet.

Any WAFU, process or system herein described, wherein dirty water is chlorinated before entering the water inlet.

Any WAFU, process or system herein described, wherein the clean water is chlorinated at <4 ppm.

As used herein, a "combined unit" means that the device has dual (or triple or more) functionality in the same treatment vessel or tank-in other words a single tank hosts multiple functionalities.

As used herein, a "tank" is a closed vessel having a top, bottom and sides with controlled entry and exit points for holding fluids. The tank in this invention is not completely sealed but has air vents at the top for air egress, as well as an air inlet via the forced air blower. However, below the vents and blower, the tank is closed and able to hold fluids. The tanks shown herein are cylindrical, but this shape is not essential. Tank may be used interchangeably with vessel herein.

As used herein, a "forced air blower" is a motorized unit with a fan that forces air into the unit. A preferred blower may be e.g., a centrifugal blower by Loren Cook.

As used herein, a "level switch high" or LSH is an automatic action initiated in the control system at a specified high fluid level measurement in the tank. A "level switch low" or LSL is an automatic action initiated in the control system at a specified low level measurement in the tank.

As used herein, a "pressure switch high" or PSH is a pressure measuring instrument which initiates an action at a specified high pressure measurement in the tank. A "pressure switch low" or PSL is a pressure measuring instrument which initiates an action at a specified low pressure measurement in the tank.

As used herein a "demister" is any device with sufficient surface area to collect entrained water from an existing air stream. A preferred demister may be e.g., a Lanpac demister by LANTEC or a Flexifiber or FlexiChevron demister by Koch-Glitsch.

As used herein a variable speed pump allows control over the pumping rate of a fluid. Speed is typically controlled with frequency or voltage. Many such pumps are centrifugal, but this is not essential.

As used herein, a vent is an opening through which air may exit a tank. It is typically covered with a screen to prevent insect entry.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim. The phrase "consisting of" is closed, and excludes all additional elements. The phrase "consisting essentially of" excludes additional material elements, but allows the inclusions of non-material elements that do not substantially change the nature of the invention, such as instructions for use, gauges and sensors, valves, safety equipment, up- and downstream components added thereto, and the like. Any claim or claim element introduced with the open transition term "comprising," may also be narrowed to use the phrases "consisting essentially of" or "consisting of," and vice versa. However, the entirety of claim language is not repeated verbatim in the interest of brevity herein.

The following abbreviations are used herein:

| ABBREVIATION | TERM |
| --- | --- |
| PP | Polypropylene |
| PVC | Polyvinyl chloride |
| PTFE | Polytetrafluoroethylene |
| WAFU | Water aeration and filtration unit |
| PSH | Pressure switch high |
| PSL | Pressure switch low |
| LSH | Level switch high |
| LSL | Level switch low |
| GST | Ground storage tank |
| gpm | Gallons per minute |
| cfm | Cubic feet per minute |
| ppm | Parts per million |

DETAILED DESCRIPTION

The treatment of water for human consumption, including groundwater, well water, and surface water, involves addressing contamination from dissolved mineral matter; dissolved gases; sediments; organic matter affecting color, tastes, and odors; and microorganisms. The unit operations typically involve aeration, filtration, and chlorination.

This invention provides devices, systems, and methods wherein i) aeration and filtration, or ii) aeration, filtration, and chlorination, are all provided by a single combined unit, instead of separate units connected in series.

In the preferred embodiment of the invention, feed water pumps provide a constant feed flow to the combined water aeration and filtration unit or "WAFU". The feed water, supplied at ambient temperature, enters the top aeration section through spray nozzles which are designed to atomize the water particles between 200 to 100 microns. Atomized particles increase the surface area of contact between water and air and provide for enhanced mass transfer.

The aeration section is an open chamber providing four to ten feet, preferably six feet of height from the feed nozzles to the liquid level in the filtration section. Atmospheric air is introduced into the aeration section by a forced draft blower, located centrally on top of the vessel in the larger device of FIG. 6 or on the side in the top $\frac{1}{3}$-$\frac{1}{2}$ of the smaller unit of FIG. 3.

The air provides oxygen to oxidize dissolved iron and manganese minerals in the well water. Upon oxidation, the soluble iron and manganese minerals turn into iron and manganese minerals in insoluble form, changing the color of water as they travel from top to bottom in the aeration zone. The insoluble minerals are easily trapped by the filter unit. The air is also used as a stripping gas to remove objectionable volatile gas components from the water.

The gases typically found in well water include hydrogen sulfide, methane, and carbon dioxide. In the larger units, the air flow is not set by the oxygen or stripping air demand, but is set to provide sufficient downward velocity flow such that the air flows down through the center of the aeration section and then back up along the walls, where the air exits through two to six vents (depending on vessel size) located on the top of the vessel. Therefore, air and water contact are both concurrent as the air flows down the middle of the vessel and countercurrent as the air comes back up along the sides of the vessel, to exit through the top mounted vents.

In the smaller units, however, the dual countercurrent and current flow is not needed, and forcing air from the bottom suffices to achieve sufficient aeration. Air flow for is between 100 cfm/square ft to 150 cfm/square ft and liquid flow rate for the filtration section is between 2.5 gpm/square ft to 5 gpm/square ft.

The vents are provided with disengagement media which can capture entrained water particles in the vent stream, resulting in a discharge gas containing the objectionable volatile gas components without significant moisture. The preferred disengagement media is loose plastic packing for low weight and ease of cleaning, though knitted wire mesh and other demisters are also acceptable. Surge tank and recycle tank vents do not require any packing media.

In the open chamber of the aeration section, two to four redistributor rings, placed every two to three feet, are placed on the walls to avoid channeling of water and/or air along the vessel walls—the rings force the water and air away from the walls and towards the middle of the vessel. The rings may be annular, circumnavigating the chamber, or be broken into pieces, preferably which overlap, or be a complete circular screen with solid edges and interior mesh.

In an alternate embodiment of the invention, to be considered when there is insufficient iron and manganese present to introduce fouling issues, a section of loose plastic packing is placed in the open chamber of the aerator. The packing provides for increased surface area of the water, which increases contact between the water and air, and increases mass transfer. This embodiment is preferred for cases with minimal iron and manganese and high levels of gases where longer contact time is essential. A forced-draft blower is located on the straight sidewall of the vessel between the aeration and filtration sections.

Use of the forced draft blower, which blows clean atmospheric air into the unit, eliminates common problems with induced draft blowers in this type of service. The induced draft blower draws air from the vessel, said air carrying contaminants, water vapor, and mist out of the vessel to the atmosphere. This contaminated air is corrosive and poses operational issues as compared the forced draft blower, which provides only clean atmospheric air. Induced draft blowers also must be provided with an explosion proof design when methane is present, due to the possibility of contaminated air with methane within the explosive limits.

For the top-mounted forced draft blower, the flowrate and downward velocity through vessel is set to avoid too low a velocity, which would short-circuit the stripping air through the vents, with minimal air-water contact, or too high a velocity, which would disrupt the filtration section and blow water mist out the vents. The velocity is in a range of 100 to 200 cubic feet of air per square foot of vessel cross sectional area for both units. Air from the vents may be directed to additional units to remove contaminants or can be discharged if not too dirty.

Chlorine is injected between the aeration and filtration sections, one to two feet above the backwash collection trough at the top of the filtration section, and one to two feet below the controlled water level in the filtration section. The purpose of placing the chlorine line about one foot above the trough is so that during backwash no filter media can clog the chlorine line. The chlorine provides for the destruction or inactivation of harmful bacteria and other microorganisms, and thus cannot be placed here in a biological filtration system. The chlorine also continues oxidation of remaining dissolved mineral matter in the water. The water level in the filter creates a physical separation of the filtration unit and aeration unit. Alternatively, chlorine can be injected upstream, so that water entering the unit is already chlorinated, or injected downstream in a biological filtration system.

The filter media follows the current state of the art, and as such will typically employ dual media sand-crushed anthracite coal filtration as typically specified for the removal of turbidity and suspended solids as low as 10 to 20 microns, but other filtration media and methods are possible. The sand can be substituted with Greensand (a silica sand core coated with manganese dioxide) in certain applications.

Dual media filters provide very efficient particle removal at relatively high filtration rates. Dual bed depths are typically 12" of anthracite atop 18" of sand or Greensand, though this can vary depending on the application and size and capacity of the unit. The filtration rate is typically 3.5 to 5 gpm of water per square foot of cross-sectional area, and this rate typically sets the vessel cross-sectional area.

The dual filtration media are supported on a gravel subfill. The gravel subfill serves two purposes. First, it acts as a barrier between the filter media and the underdrain. The openings in the underdrain must be larger than the grains of filter media to avoid plugging. The layers of gravel prevent the filter media being lost through these openings. Second, the gravel aids in the distribution of the backflow wash.

Proper maintenance of liquid level is important to operation. The liquid level is maintained one to three feet, preferably about two feet, above the backwash collection trough, which itself is placed to allow a maximum of 50% expansion of the filter bed during backwash. In addition to protecting the chlorine feed line, as described above, maintaining this liquid level in the vessel also provides adequate liquid surge volume for the transfer pumps. An ultrasonic level transmitter will precisely measure the water level, which in turn will control the variable frequency drives of the transfer pumps, to regulate outflow so as to maintain constant level.

The aerated and chlorinated water flows down through the filter media, where solid particles, including the insoluble iron and magnesium salts formed by oxidation in the aerator section and through chlorination, are removed. The underdrain at the bottom of the filtration section uniformly collects the filtered water to maintain a constant rate of filtration across the filter bed and passes the water to the outlet of the filter.

The treated water is withdrawn through a bottom nozzle of the filter and pumped by the transfer pumps, typically to storage but possibly directly to the water distribution system.

The solids removed from the treated water are themselves removed from the filter media by water backwash, in a manner consistent with the current state of the art. Backwash water introduced at the bottom of the unit is evenly distributed across the cross section of the filter by the underdrain and flows upwards through the expanded filter bed. The backwash water and solids are collected in the water trough located above the filter bed and withdrawn from the vessel. The backwash rate follows the current state of the art at a range of 15-20 gpm/ft$^2$ of filter bed cross sectional area.

The figures below provide details with respect to large (25 foot diameter) and small (≤4 foot) units. However, this is exemplary only, and the invention can be broadly applied to any size unit and any water treatment needs.

Figure 3:
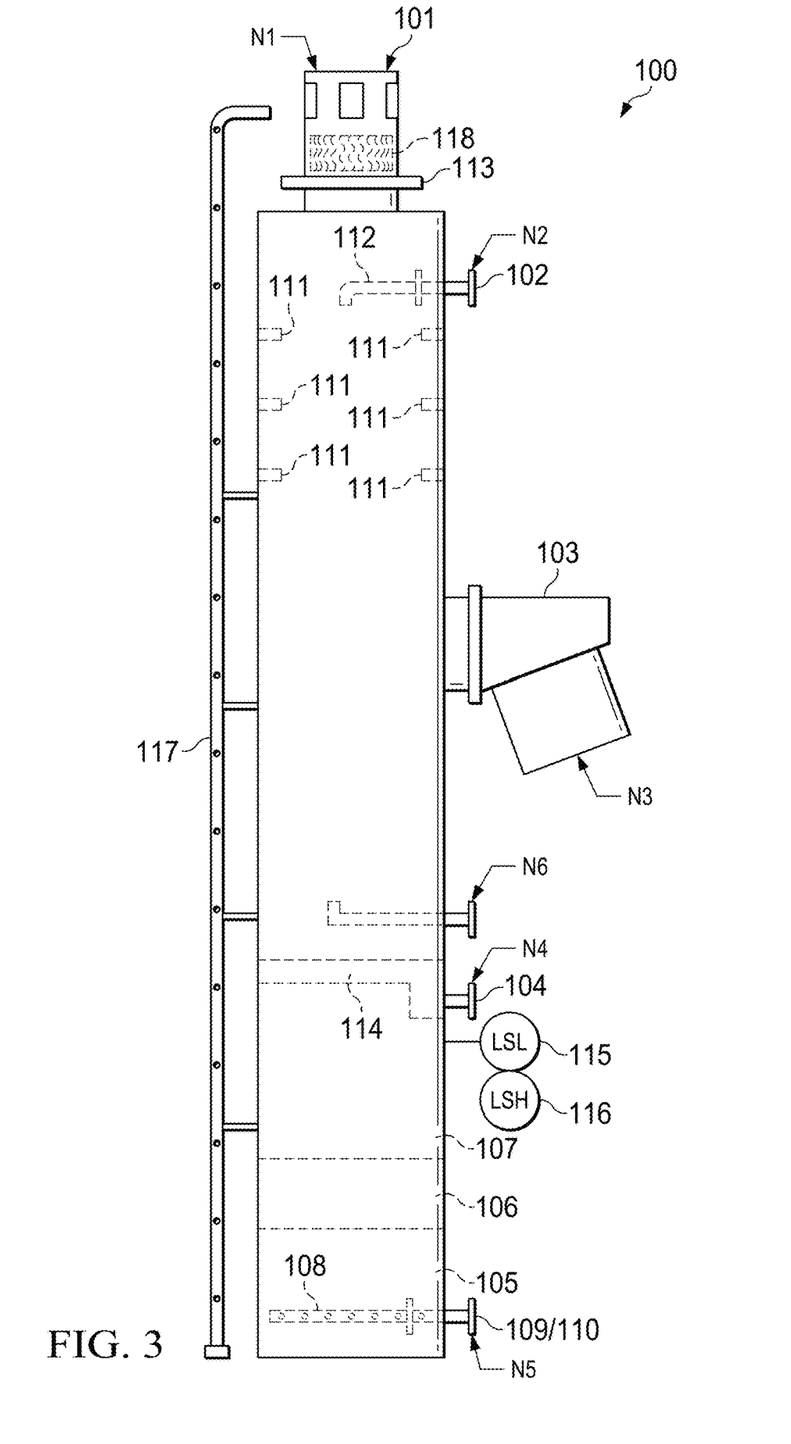
FIG. 3 Elevation of a single small unit (diameter≤4 ft) for aeration and filtration.

FIG. 3 shows an elevational view of a ≤4 foot diameter combined aeration and filtration unit 100. Starting at the top of the unit 100, we see the vent/demister section N1 having vents 101 shown shaded to indicate a screen covering, e.g., with 16 mesh SS304 screen. Flange 113 allows the demister section to be connected to the aeration section, and can be opened for servicing of the demister, e.g., replacement or cleaning of the demister pad 118.

The water inlet contains entry point 102 for untreated water and the water is broken into droplets on entry by spray nozzle 112. The spray nozzle 112 should be sufficient to spray water into fine droplets at least as widely as the tank diameter for adequate aeration.

Redistributor rings 111 prevent water channeling on the vessel periphery improving mass transfer between water and air. Here we have shown three rings, but two are possible, and more may be needed in a larger tank. In addition, the rings may only partially circumnavigate the tank, providing baffles to drive water off the walls, but rings are more efficient.

A forced draft blower 103 is positioned at least 4 to 5 feet above the trough to provide minimum 5 minutes of surge time for the filter transfer pump. The blower serves to force air up through the water droplets, breaking them into even smaller droplets and removing all gas-based impurities and potentially oxidizing or stripping off any impurities.

Backwash outlet 104 and trough 114 that are positioned about 2 feet above the anthracite media, the two-foot margin representing 50% of the typical media expansion or lift during backwash. The trough is designed to take between 15 to 20 gpm/square foot of backwash water flow during the periodic filter backwash and cleaning.

A chlorine injection point (N6) into the water level above the filter provides chlorine for additional oxidation of water contaminants. The quantity injected is determined by the type and level of contaminants in a particular application.

The filter system consists of gravel base 105, sand filter media 106 and anthracite filter media 107. Buried in the gravel 105 is a filter drain 108, located about 6 inches above the bottom to prevent the drain holes from being clogged with fine particulates. The underdrain 108 connects to backwash inlet 109 and filtered water outlet 110, which are the same inlet/outlet although flow is reversed depending on function.

Figure 4:
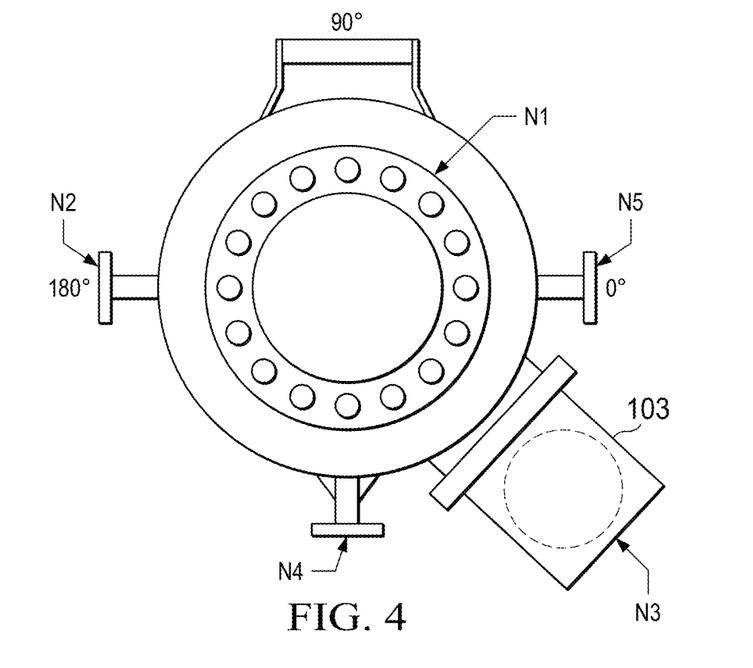
FIG. 4. Top plan view of the unit of FIG. 3.

Level switch low 115 stops the transfer pump to protect the pump from cavitating on low level. Level switch high 116 stops the well pump to avoid rising water flooding into the blower housing, which can damage high speed blower fan. Ladder 117 allows servicing on the unit. FIG. 4 shows the same unit 100 as FIG. 3, but in plan view looking down at the top. Table 1 lists out the nozzle description and quantities used in the combined aeration and filtration unit.

TABLE 1

Nozzle Description for FIG. 3

| Nozzle | Description | Quantities |
| --- | --- | --- |
| N1 | Vent | 1 |
| N2 | Inlet | 1 |
| N3 | Blower and Motor Housing | 1 |
| N4 | Backwash | 1 |
| N5 | Outlet | 1 |
| N6 | Chlorine Injection | 1 |

Figure 5:
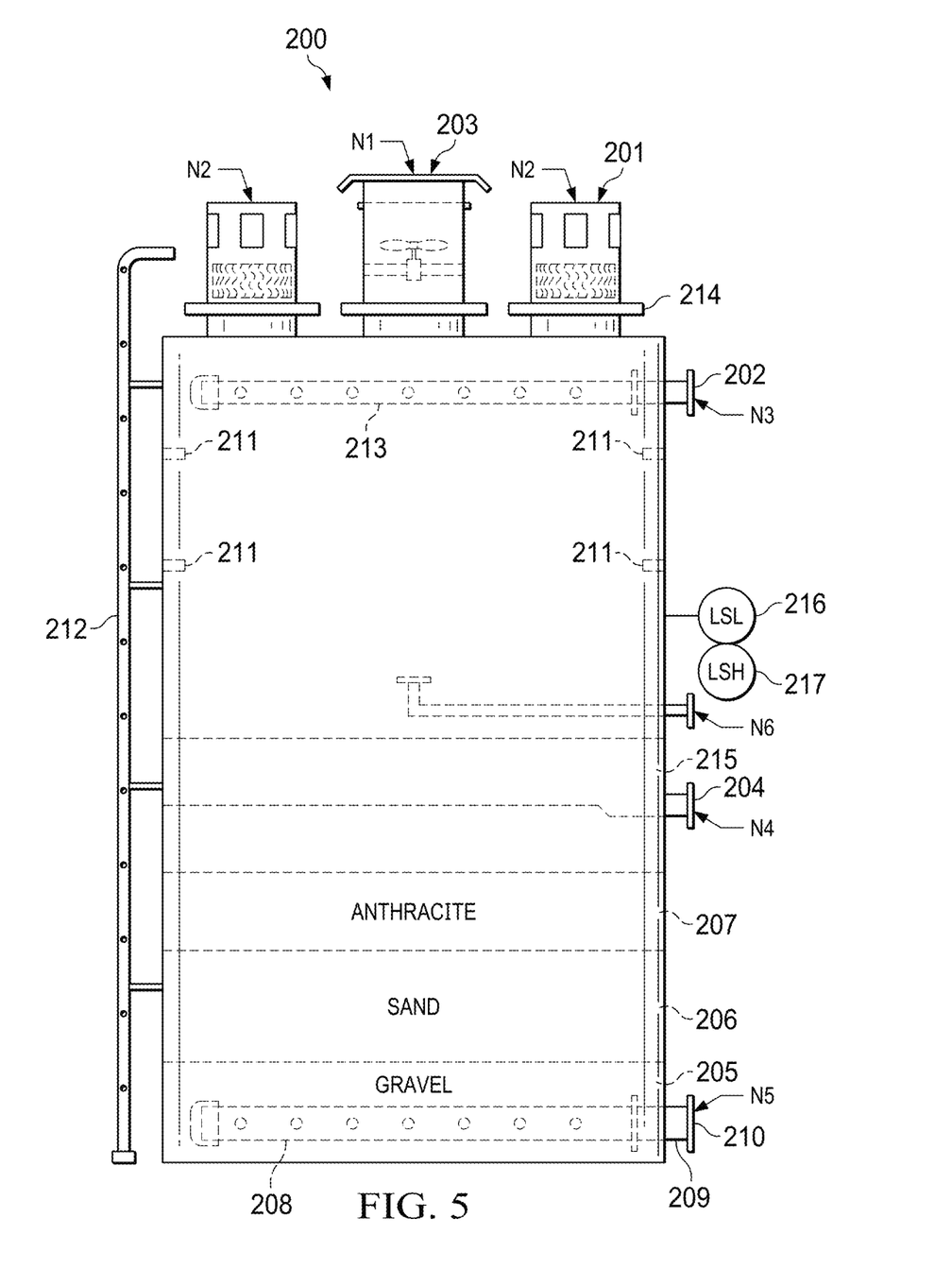
FIG. 5 Elevation of a single large unit (diameter≥5 ft) for aeration, filtration and chlorination.

FIG. 5 shows a combined aeration filtration unit 200 for a≥5 foot diameter unit, which is similar to the one in FIG. 3-4, but where the vents 201 are in triplicate equally spaced around the perimeter, and the blower 203 is moved to a central top position. In addition, instead of a single spray nozzle, distributor 213 sprays water from several holes/nozzles along its length, thus distributing water across the whole diameter of the unit 200. Table 2 presents the nozzle description and their quantities for the combined aeration and filtration unit in FIG. 5.

Figure 6:
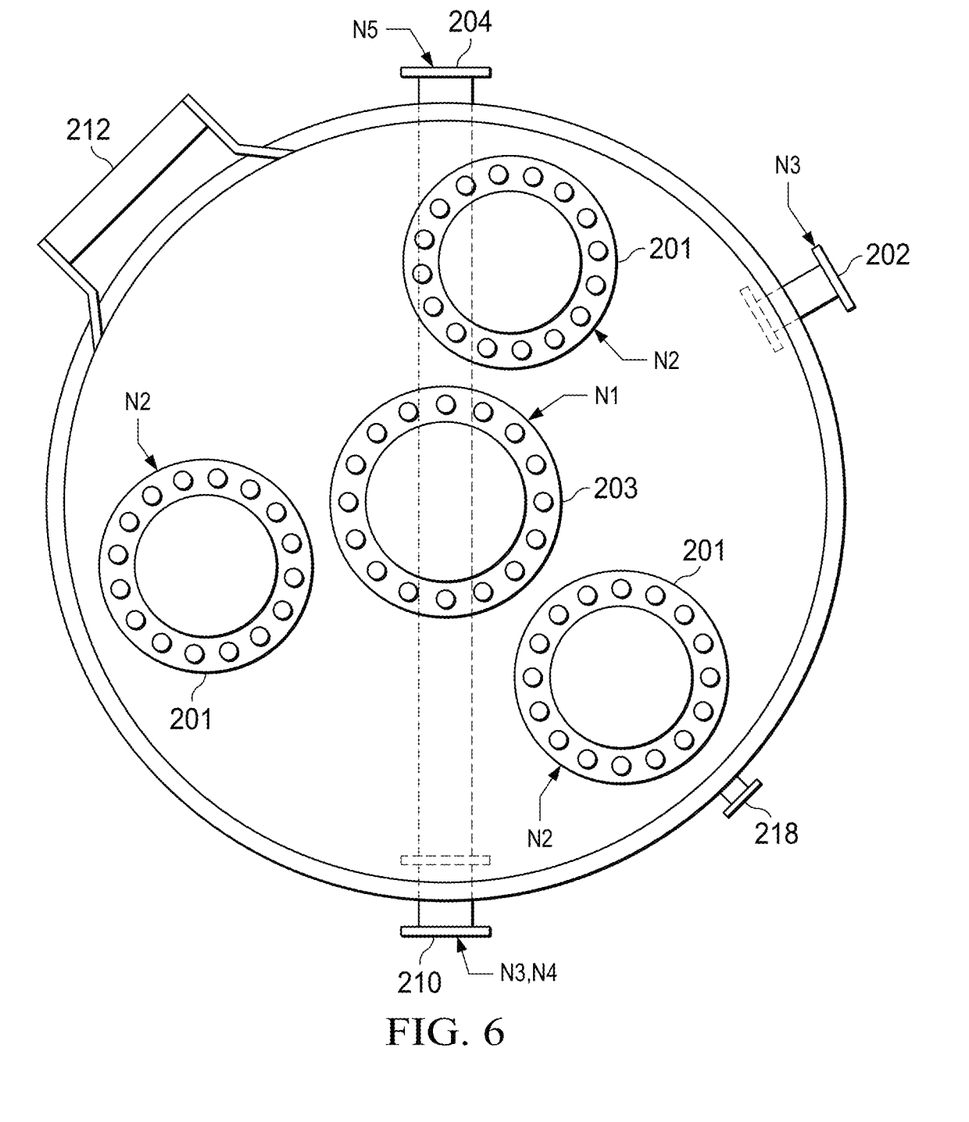
FIG. 6. Top plan view of the unit of FIG. 7A-B.

Otherwise, the parts are similar, including water inlet 202 for untreated water, backwash outlet 204 exit point for contaminated backwash flow, gravel base 205, sand media 206, and anthracite media 207. Filter underdrain 208, backwash inflow/filtered water outflow 209/210, 211 redistributor rings or baffles or screens, ladder 212, flange 214 (e.g., 125 #rating flange), backwash trough 215, level switch low 216, level switch high 217. FIG. 6 is a top plan view of the same unit at FIG. 5.

TABLE 2

Nozzle Description for FIG. 5

| Nozzle | Description | Quantities |
| --- | --- | --- |
| N1 | Blower and Motor Housing | 1 |
| N2 | Vent | 3 |
| N3 | Distributor | 1 |
| N4 | Backwash Outlet | 1 |
| N5 | Outlet | 1 |
| N6 | Chlorine Injection | 1 |

Figure 7A:
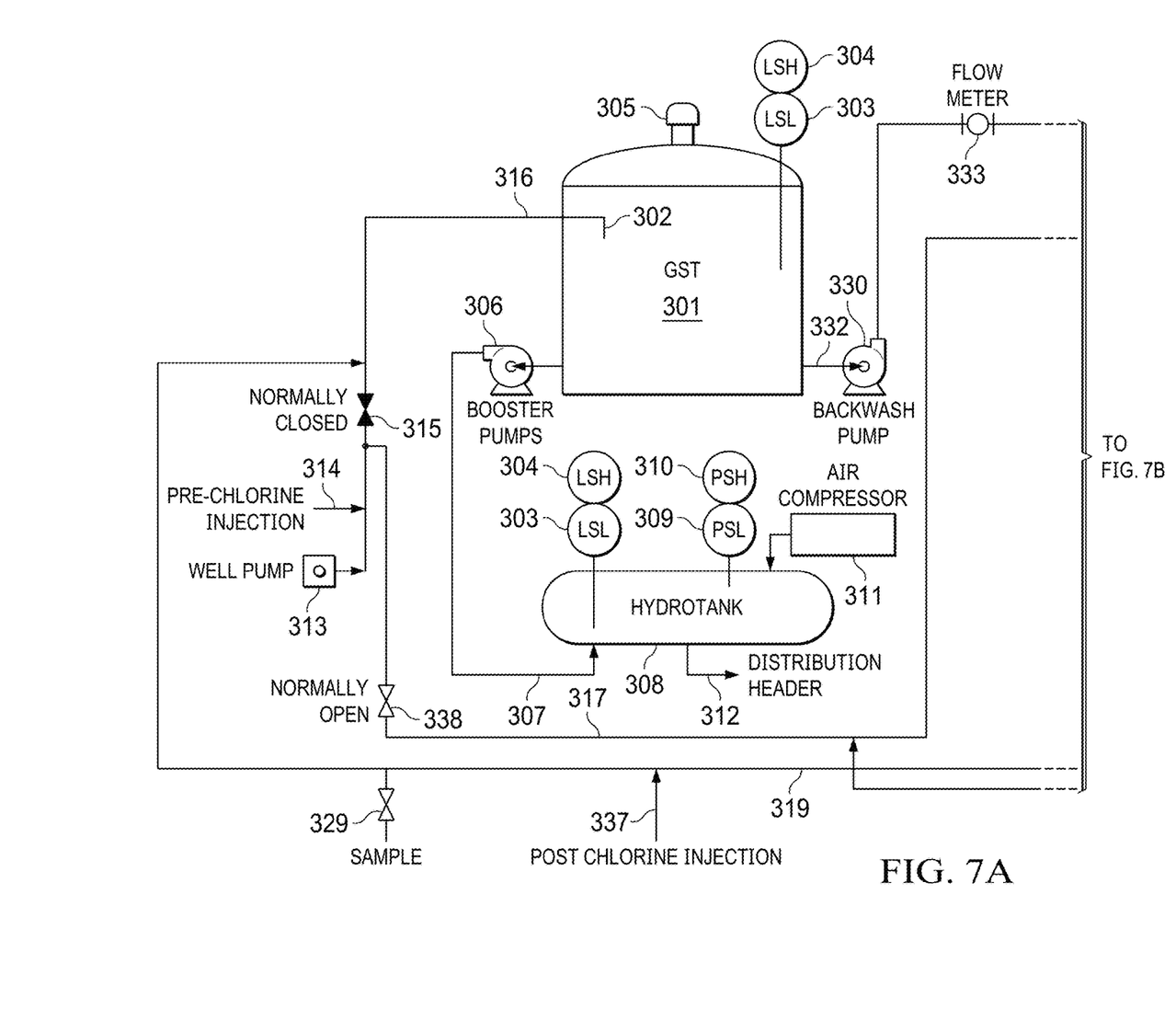
FIG. 7A-B. Exemplary complete system with upstream pre-chlorination, chlorine injection in WAFU unit, and post chlorine injection.
Figure 7B:
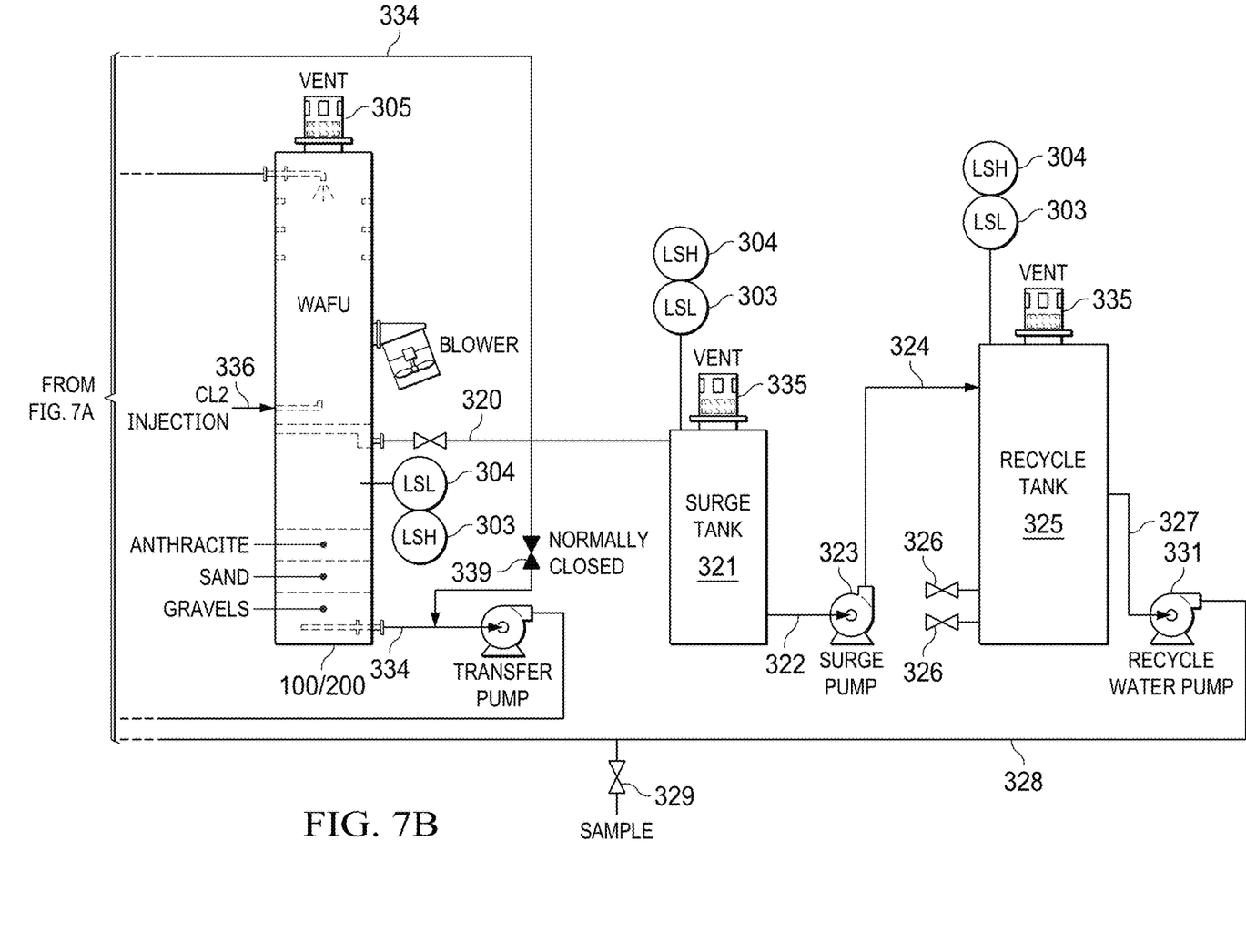

FIG. 7A-B is an exemplary system including a smaller combined aeration/filtration unit and injection of chlorine. In this system, the components are the ground storage tank (GST) 301, inlet pipe 302, level switch low (LSL) 303 and level switch high (LSH) 304, which are sensors to control water level. The GST has an open vent 305 with stainless steel 16 mesh size screen to prevent entry of bugs. Well pump 313 pulls water from ground for treatment before use. Pre-chlorine injection 314 is provided for intermittent shock chlorine dosing of the aerator/filter system, for disinfection and prevention of algae growth in the upper section of the aerator/filter system. Isolation valve 315 is normally closed, but when open line 316 directs connection of well water to the GST 301 (closing normally open valve 338).

Line 317 carries chlorinated water from the well pump 313 to the combined aeration filtration unit (unit similar to 100 is shown, but it could be 200 or any other embodiment).

Transfer pump 318 is a centrifugal pump that carries treated water via line 319 from the combined aeration filtration unit 100/200 to the GST. Transfer pump discharge line 319 is sized to keep water velocity below 5-6 ft/sec. Post chlorine injection point 337 into line 319 is provided to establish the residue chlorine level in the treated water at 1-2 ppm.

Centrifugal booster pump 306 transfers treated water from GST to the hydrotank through booster pump outlet line 307, sized to keep water velocity below 5-6 ft/sec. Hydrotank 308 is a pressurized tank designed to push water into the distribution header, which supplies clean water to customers. Air compressor 311 provides supply air to keep hydrotank pressurized between 50 to 60 psig using pressure switch low (PSL) 309 and pressure switch high (PSH) 310. LSH and LSL function as above.

Backwash pump 330 is sized to keep 15 to 20 gpm/ft$^2$ of flow rate in the filter section during the backwash. Inlet line 332 (velocity below 3 ft/sec) and discharge line 334 (velocity below 5-6 ft/sec) has flow meter 333 and isolation valve 339 which is normally closed. Line 320 provides dirty backwash water from the aeration filtration unit to the surge tank 321, which is designed to hold backwash water for 2 to 3 minutes, as surge for pump 323.

The backwash water is sent to the recycle tank 325 using line 322 (velocity below 3 ft/sec), surge pump 323 and line 324 water (velocity below 5-6 ft/sec). The purpose of recycle tank 325 is to hold the water for at least 24 hours to allow settling time for the solid particles and is designed to hold three backwash volumes of the filter system.

The inlet line connection for recycle water pump 331 is taken at least 2 ft from bottom to draw clean water from the tank, which is recycled for reuse. The typical ratio of recycle pump 331 is 10% of the well water pump 313 flow. Two drain valves 326 are provided, one drain valve is 6" from bottom and the other drain valve is 12" from bottom. The two drain valves allow the operator to monitor the sludge height in the recycle tank 325. The recycle water is connected to line 317, returned to the aeration filtration unit by 327 and recycle water pump 331 and pump discharge line 328 (velocity below 5-6 ft/sec). Sampling valve 329 allows monitoring of recycle water quality.

Backwash centrifugal pump 330 provides backwash to the aeration filtration unit from the GST via pump suction line 332 (velocity below 3 ft/sec), backwash pump 330, and line 334. Backwash flow rate is controlled by 339 valve using flow meter 333.

The following references are cited in their entireties for all purposes:

epa.gov/ground-water-and-drinking-water/national-primary-drinking-water-regulation-table.

Khorsandi, H. et al., Innovative anaerobic upflow sludge blanket filtration combined bioreactor for nitrogen removal from municipal wastewater, Int. J. Environ. Sci. Tech., 8 (2), 417-424, Spring 2011, available online at bioline.org.br/pdf?st11038

The invention claimed is:
1. A combined water aeration and filtration unit (WAFU), said WAFU comprising a single tank;
   a) said tank with a vent section at a top of said WAFU and above an aeration section;
   b) said aeration section above a filter section at a bottom of said WAFU;
   c) said vent section comprising one or more demisters and one or more vents for detraining water and providing a dry air exit from said WAFU;
   d) said aeration section comprising a water inlet ending in a spray nozzle near a top of said aeration section to turn incoming dirty water into water droplets;
   e) said aeration section comprising a forced air blower on a side or top of said aeration section for blowing air through said water droplets in rate sufficient to remove volatile organic compounds and precipitate manganese and iron;
   f) said aeration section further comprising one or more protrusions on an inside wall of said tank to force water from said inside wall into an interior of said tank;
   g) a backwash collection trough and backwash water outlet positioned above said filter section for removing dirty backwash water from said WAFU; and
   h) said filter section having one or more filters therein and having a drain and clean water outlet near a bottom of said filter section for egress of clean water from said WAFU.

2. The WAFU of claim 1, wherein said forced air blower is mounted near said top of said WAFU.

3. The WAFU of claim 1, wherein said forced air blower is mounted on a sidewall near a bottom of said aeration section.

4. The WAFU of claim 1, wherein said tank is ≥5 feet in diameter and said forced air blower is centrally mounted at said top of said WAFU surrounded by three equally spaced vents and said water inlet has a plurality of spray nozzles spraying water across a diameter of said tank.

5. The WAFU of claim 1, wherein said WAFU is configured so that a section of loose plastic fiber packing in said aeration section the increases water air contact and mass transfer.

6. The WAFU of claim 1, wherein said WAFU is configured so that disinfectant is injected into said WAFU below said aeration section and above said backwash collection trough.

7. The WAFU of claim 1, wherein said WAFU is configured so that disinfectant is injected into said WAFU below said aeration section and 1-3 feet above said backwash collection trough.

8. The WAFU of claim 6, wherein said disinfectant is chlorine.

9. The WAFU of claim 1, wherein said WAFU is configured so that a liquid level in said filtration section is maintained by an ultrasonic level transmitter regulating one or more pumps providing water to said water inlet.

10. The WAFU of claim 1, wherein said protrusions comprise an annular ring or partially annular baffles or a screen with a solid edge across said tank.

11. The WAFU of claim 1, wherein said filter section comprises a gravel base, sand middle layer and anthracite top layer.

12. The WAFU of claim 1, wherein said spray nozzle is configured to disperse water droplets across an entire diameter of said tank.

13. The WAFU of claim 1, wherein said spray nozzle is a plurality of spray nozzles configured to disperse water droplets across an entire diameter of said tank.

14. A process for water purification, comprising:
   a) providing dirty water to the WAFU of claim 1 via said water inlet;
   b) blowing air through said dirty water in said aeration section to provide aerated water;
   c) filtering said aerated water in said filtration section to provide clean water;
   d) collecting clean water from said clean water outlet;
   e) continuing steps a-d for a time;
   f) halting steps a-d and running clean water in through said clean water outlet and out said backwash water outlet unit until said filtration section is cleaned; and
   g) repeating steps a-f) one or more times.

15. The process of claim 14, wherein disinfectant is injected into said WAFU below the aeration section and above said backwash collection trough.

16. The process of claim 14, wherein chlorine is injected into said WAFU below the aeration section and 1-3 feet above said backwash collection trough.

17. The process of claim 14, wherein said dirty water is chlorinated before entering said water inlet.

18. The process of claim 14, wherein said clean water is chlorinated at 2-4 ppm.

19. A process for water purification, comprising:
   a) providing dirty water to the WAFU of claim 6 via said water inlet;
   b) blowing air through said dirty water in said aeration section to provide aerated water;
   c) injecting a chlorine based disinfectant above said backwash collection trough into said aerated water to provide chlorinated water;
   d) filtering said chlorinated water in said filtration section to provide clean water;
   e) collecting clean water from said clean water outlet;
   f) continuing steps a-e for a time;
   g) halting steps a-e and running clean water in through said clean water outlet and out said backwash water outlet unit until said filtration section is cleaned; and
   h) repeating steps a-g one or more times.

20. A system for purifying water to drink, said system comprising:

a) a source of dirty water;
b) means to pump said dirty water from said source to a combined water aeration and filtration unit (WAFU), said WAFU comprising:
   i) a tank with a vent section at a top of said WAFU and above an aeration section;
   ii) said aeration section above a filtration section at a bottom of said WAFU;
   iii) said vent section comprising one or more demisters and one or more vents for detraining water and providing a dry air exit from said WAFU;
   iv) said aeration section comprising a water inlet ending in a spray nozzle near a top of said aeration section to turn incoming dirty water into water droplets;
   v) said aeration section comprising a forced air blower on a side or top of said aeration section for blowing air through said water droplets in rate sufficient to remove volatile organic compounds and precipitate manganese and iron;
   vi) said aeration section further comprising one or more protrusions on an inside wall of said tank to force water from said inside wall into an interior of said tank;
   vii) a backwash collection trough and backwash water outlet positioned above said filter section for removing dirty backwash water from said WAFU;
   viii) said filtration section having one or more filters therein and having a drain and clean water outlet near a bottom of said filtration section for egress of clean water from said WAFU; and
c) means to pump said clean water to a distribution system for consumers.

21. The system of claim 20, further comprising one or more water purification units positioned upstream of said dirty water inlet.

22. The system of claim 20, further comprising one or more water purification units positioned downstream of said clean water outlet and before said distribution system.

23. The system of claim 20, further comprising a chlorine source for injecting chlorine into said dirty water before said WAFU.

24. The system of claim 20, further comprising a chlorine source for injecting chlorine into said WAFU above said backwash water outlet.

25. The system of claim 20, wherein air velocity of said blowing air is 100 to 200 cubic feet of air per square foot of tank cross sectional area.

* * * * *

UNITED STATES PATENT AND TRADEMARK OFFICE
CERTIFICATE OF CORRECTION

PATENT NO. : 12,252,415 B2
APPLICATION NO. : 17/834245
DATED : March 18, 2025
INVENTOR(S) : Keyur Gorji Page 1 of 1

It is certified that error appears in the above-identified patent and that said Letters Patent is hereby corrected as shown below:

In the Claims

On Column 13, Line 66, of Claim 5:
"aeration section the increases water air contact and mass" should read as --- aeration section increases water air contact and mass ---

Signed and Sealed this
Twenty-ninth Day of April, 2025

Coke Morgan Stewart
*Acting Director of the United States Patent and Trademark Office*